Oct. 8, 1946.　　　J. D. KENNELLY　　　2,409,046
SIGNAL DEVICE
Filed June 22, 1944　　　3 Sheets-Sheet 2
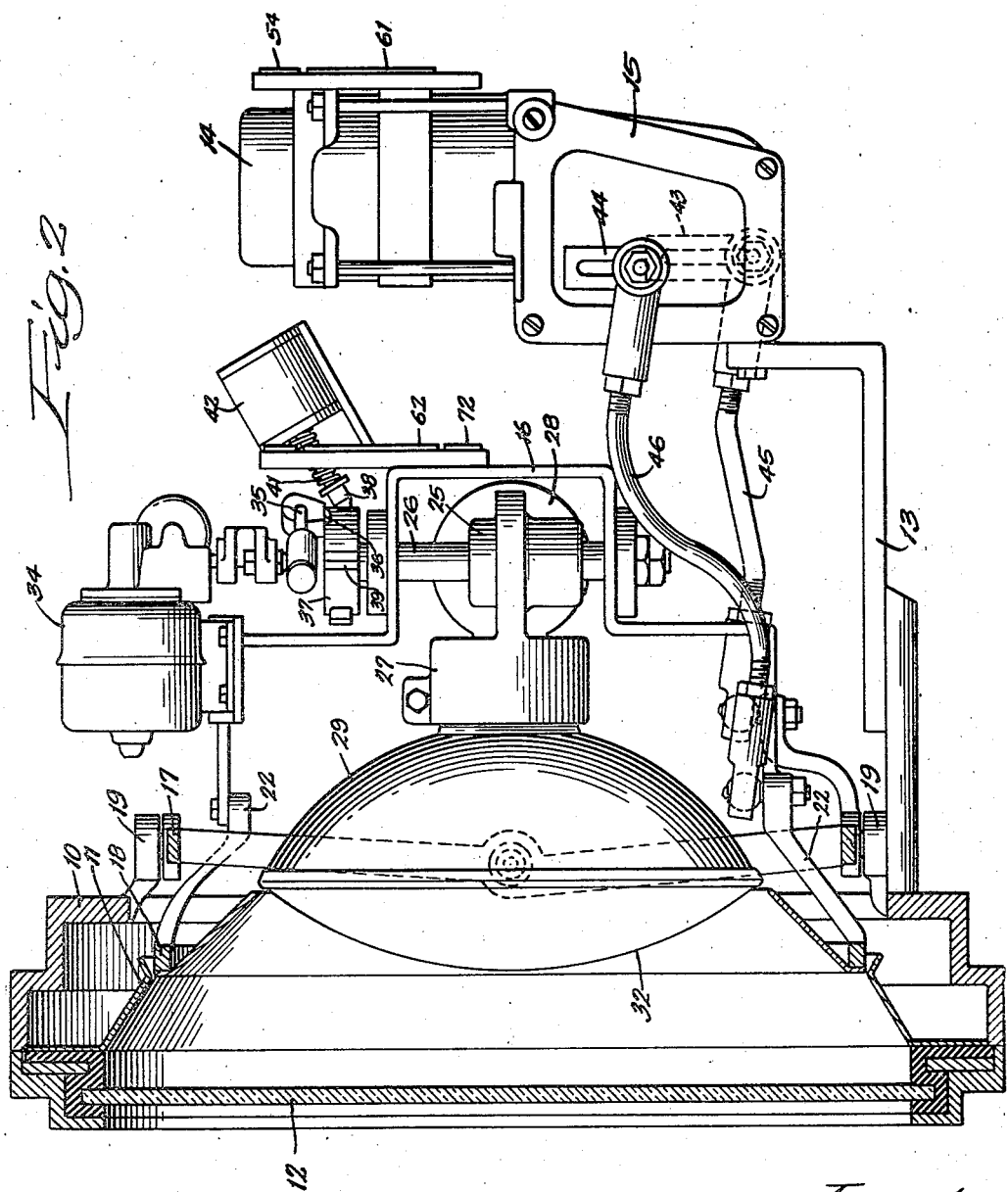

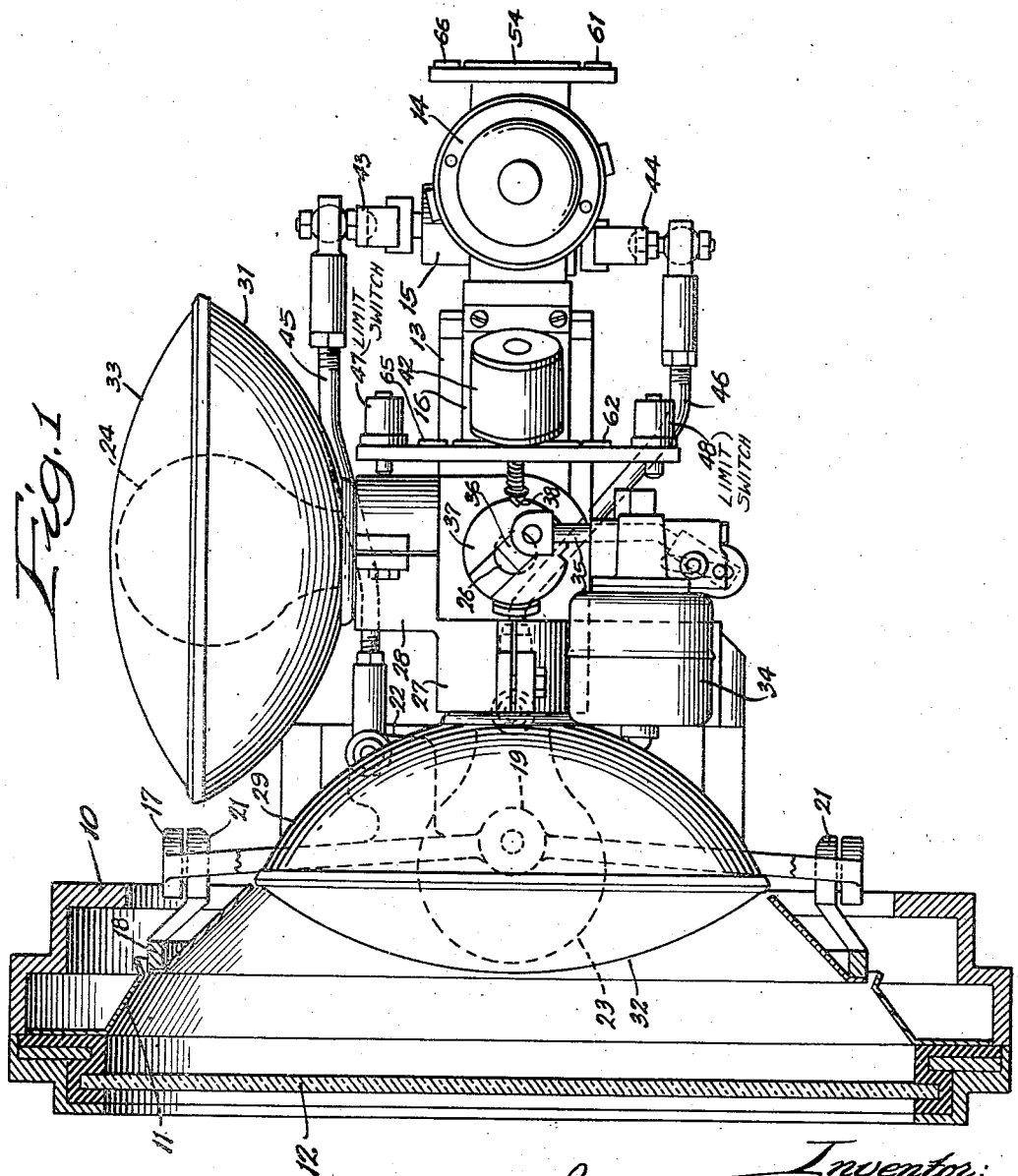

Oct. 8, 1946.  J. D. KENNELLY  2,409,046
SIGNAL DEVICE
Filed June 22, 1944  3 Sheets-Sheet 3
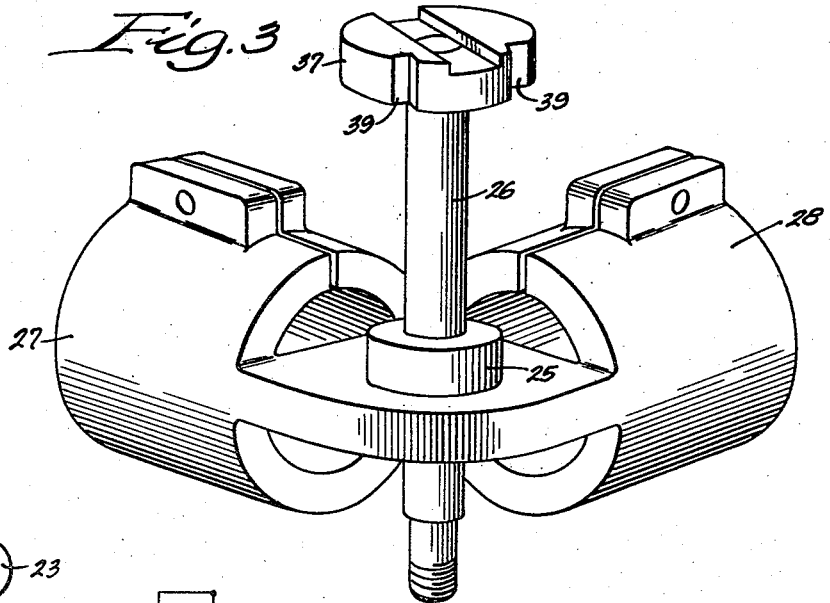
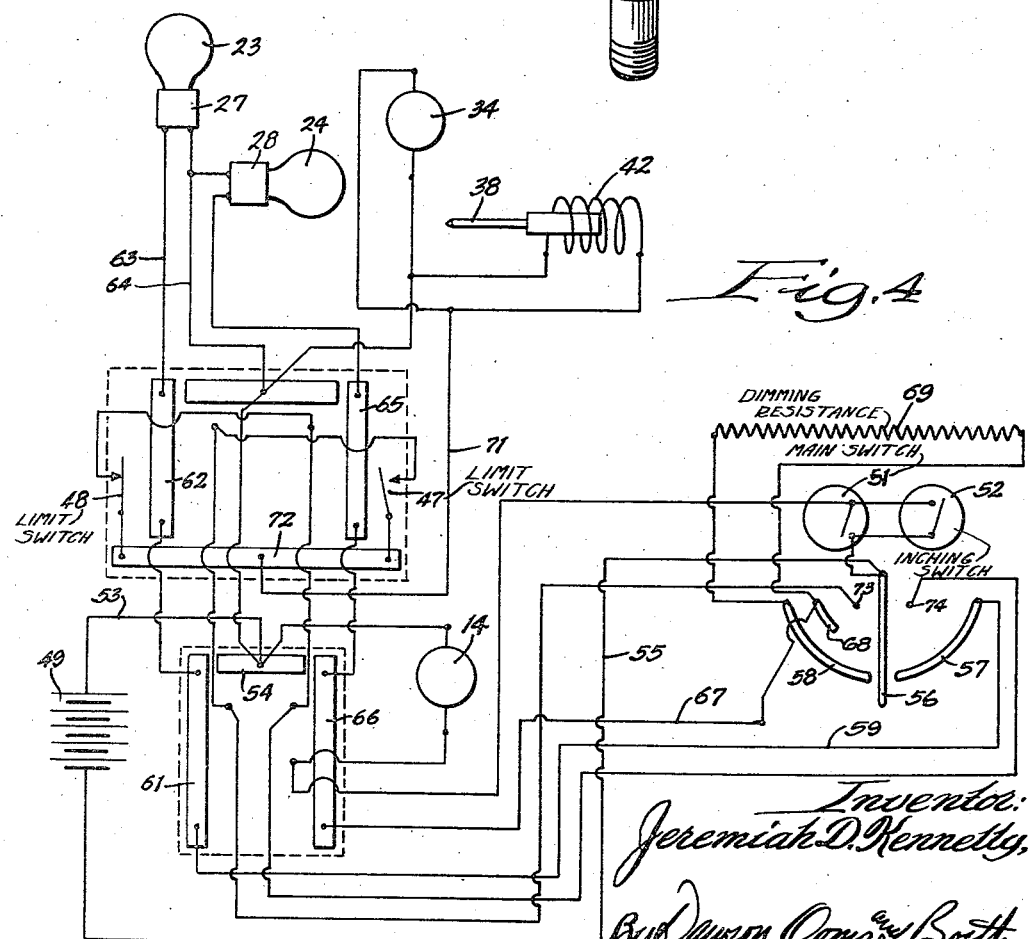

Patented Oct. 8, 1946

2,409,046

UNITED STATES PATENT OFFICE 2,409,046

SIGNAL DEVICE

Jeremiah D. Kennelly, Oak Park, Ill.

Application June 22, 1944, Serial No. 541,561

6 Claims. (Cl. 177—329)

This invention relates to signal devices and more particularly to signal lights having a plurality of selectively operable light sources.

Although not limited thereto, the present invention is particularly adapted for use on railroad trains and will be described in connection therewith. When a railroad train is stopped on a track, it is highly desirable to signal approaching trains without requiring trainmen to carry signal lamps or the like down a track. It is accordingly one of the objects of the present invention to utilize the usual headlights or running lights on a train as signal lights to indicate danger to approaching trains.

Another object of the invention is to provide a signal device in which two light sources may be selectively operated. Specifically one of the light sources may be a white light for running or normal operation, while the other may be a red light to indicate danger.

Still another object of the invention is to provide a signal device in which either or both the normal running light and the danger signal light may be oscillated thru a predetermined pattern to be more easily visible.

A still further object of the invention is to provide a signal device in which a support carrying two light sources may be moved to bring either of the light sources into register with a lens opening. According to one important feature, only the light which is in register with the lens opening can be energized.

The above and other objects and advantages of the invention will be more readily apparent from the following description, when read in connection with the accompanying drawings, in which—

Figure 1 is a top plan view with parts in section of a signal device embodying the invention;

Figure 2 is a side view with parts in section of the device of Figure 1;

Figure 3 is an enlarged perspective view of the lamp support; and

Figure 4 is a wiring diagram.

The signal device as shown, comprises a main frame in the form of a ring 10 which may be secured to a railway car or the like in the opening provided for the usual head light or running light. The frame carries an annular reflector 11 and may be closed by a glazed cover 12. The frame 10 has a rearwardly extending bracket 13 supporting a motor 14 and gear box 15 for a purpose to appear later.

The main frame is universally connected to a sub-frame 16 thru an annular universal joint formed by a pair of annular rings 17 and 18. The ring 17 is supported on vertical aligned pivots in brackets 19 carried by the main frame and the ring 18 carries brackets 21 pivoted to the ring 17 on aligned horizontal pivots. Thus, the ring 18 may be moved universally relative to the main frame 10. The sub-frame 16 as best seen in Figure 2 is connected to brackets 22 on the ring 18.

The sub-frame carries two light sources indicated as incandescent lamps 23 and 24 carried by a support 25 which is pivotal on a vertical axis on the sub-frame. As best seen in Figure 3 the support includes an elongated pivot rod 26 having projecting therefrom at right angles a pair of sockets 27 and 28 carrying the lamps 23 and 24 respectively.

The sockets also carry reflectors 29 and 31 cooperating with the lamps 23 and 24 and which may be closed by glazed covers 32 and 33.

Support 25 is adapted to be turned by a motor 34 carried by the sub-frame and reciprocating a link 35 as the motor is operated. The link is pivoted to a block 36 which is adjustably slidable in a cross slot in a head 37 connected to the upper end of the pivot rod 26. Preferably the block 36 is locked in adjusted position so that a full stroke of the connecting rod 35 will turn the support thru an angle sufficient to move one of the light sources into register with the opening in the reflector 11 and the other of the light sources fully out of register therewith.

The support is adapted to be locked in either of its extreme positions with either one or the other of the light sources in register with the reflector opening by a latch 38 movable into one or the other of a pair of notches 39 in the head 37. The latch is urged into engagement with the notches by a spring 41 and may be moved out of engagement with the notches by a solenoid 42.

In order to oscillate the sub-frame and the lamps carried thereby to cause the light beams to move thru a predetermined pattern, the gear box 15 is provided on its opposite ends with cranks 43 and 44 connected thru links 45 and 46 to the rings 17 and 18 respectively. Preferably the cranks are angularly displaced and may be driven at different speeds by the gear box to produce an irregular pattern such for example, as a figure 8. When the motor 14 is operating, the link 45 will rock the ring 17 about its vertical pivots while the link 46 will simultaneously rock the ring 18 about its horizontal pivots on ring 17. By properly relating the speeds of the links and the angular displacement thereof substantially any desired pattern can be obtained.

The pivotal movement of the support 25 is limited to insure that one or the other of the lamps will be in register with the reflector opening by limit switches 47 and 48. The limit switches are mounted on the sub-frame 16 and are adapted to be engaged by the sockets 27 and 28 as the support turns. Normally, the switches are closed and are opened by engagement of the support therewith to interrupt operation of the motor 34 when the support is in a position with one or the other of the lamps in register with the reflector opening. As shown in Figure 4, the switch 48 is in its normal closed position while the switch 47 is held open by engagement of the socket 28 therewith.

The lamps, the motors and the solenoid are adapted to be energized from any desired source of current indicated diagrammatically in Figure 4 as a battery 49. The motor 14 is controlled by a main switch 51 and an inching switch 52 connected in parallel. One side of the motor is connected to one side of the source 49 thru a main power lead 53 connected to a bus-bar 54 on terminal panel and the other side is connected thru the switches 51 or 52 to a second main power lead 55. Thus, when either of the switches 51 or 52 is closed, the motor 14 will operate. Preferably the switch 51 is of the type which will remain closed for semi-permanent operation of the motor 14 while the switch 52 is of the button type, and is provided to align the lights as desired when they are to be used in fixed position.

The lights and the motor 34 are controlled by a main control switch including a wiper blade 56 movable over oppositely disposed segments 57 and 58. The blade 56 is connected to the power lead 55 leading from one side of the source 49. The blade 57 is connected thru a wire 59 to a bus-bar 61 on the first terminal board, which is in turn connected to a bus-bar 62 on a second panel. The bus-bar 62 is connected by a wire 63 to the lamp 23. The other side of the lamp is connected by a wire 64 to the terminal bar 54 and thru the wire 53 to the other side of the source 49. Thus, when the blade 56 is in engagement with the segment 57 the lamp 23 will be energized. The lamp 23 is preferably the danger signal lamp and may be colored red or other desired color either by coloring the lamp itself or by providing a colored glazed cover 32 over its reflector 29.

The second lamp 24 is connected on one side to the wire 64 and on its other side to a bus-bar 65. The bus-bar 65 is connected to a bar 66 which is connected thru a wire 67 to a small segment 68 partially in register with the segment 58. The segments 58 and 68 are interconnected thru a dimming resistance 69. When the switch blade 56 is in engagement with the segment 68 the lamp 24 will be energized. When, however, the blade 56 is in engagement only with the segment 58, the lamp 24 will be connected to the source 49 thru the resistance 69 to provide dimming operation of the lamp. While the dimming resistance has been shown for connection in circuit with only one of the lamps, it will be understood that both of the lamps could be dimmed in like manner, if desired.

The motor 34 and the solenoid 42 are adapted to be simultaneously energized and for this purpose are connected in parallel as shown. One side of each the motor and the solenoid is connected to the wire 64 and thru the wire 53 to the source 49. The other side of each the motor and the solenoid is connected thru a wire 71 to a terminal bar 72 on the second terminal panel. The terminal bar 72 is connected thru switch 47 to a contact 73 adapted to be engaged by the blade 56 when it is in engagement with the segment 68. The bar 72 is similarly connected thru switch 48 to a contact 74 adapted to be engaged by the switch 56 when it is in engagement with the segment 57.

With the parts in the position shown, the lamp 23 is in register with the opening in the reflector to provide a red or other colored signal indicating danger. If the switch blade 56 is now moved into engagement with the segment 57 the lamp 23 will be energized. An oscillating beam may be provided for greater visibility by closing the switch 51 to energize the motor 14.

To turn the support to bring the other lamp 24 into register with the reflector opening the blade 56 may be swung to the left to engage the segments 58 and 68 and the contact 73. At this time, the lamp 24 will be energized and the motor 34 and solenoid 42 will also be energized thru the circuit from the contact 73. The solenoid 42 will retract the latch 38 freeing the support to turn and the motor 34 will operate thru the connecting rod 35 and head 37 to turn the entire support counterclockwise as seen in Figure 1. The motor and solenoid will remain energized until the socket 27 engages and opens the limit switch 48. At this time, the lamp 24 will be in register with the opening in the reflector, the circuit to the motor 34 and the solenoid will be opened. Thus the latch 38 will be moved by its spring 41 into the registering notch 39 to hold the support fixedly in position on the sub-frame. The signal device is now in running position showing a white light which may be oscillated by operation of the motor 14 or which may be held stationary by opening the switch 51.

In the event a train equipped with a signal device of the present invention is stopped on the track, the engineer or other trainman has only to throw the blade 56 to the right into engagement with the segment 57 and contact 74. This will immediately move the red lamp 23 into register with the reflector opening and project a red signal beam from the device. By oscillating this beam thru operation of the motor 14, it may be made visible for a long distance to indicate the presence of a stopped train on the track.

While one embodiment of the invention has been shown and described in detail herein, it will be understood that this is illustrative only and is not intended as a definition of the scope of the invention, reference being had for this purpose to the appended claims.

What is claimed is:

1. A signal device comprising a main frame adapted to be fixedly mounted on a car or the like and formed with an opening through which a light beam may project, a subframe, universal mounting means connecting the subframe to the main frame for universal pivotal movement relative thereto, a support pivoted on the subframe, a pair of light sources carried by the support to be moved selectively into register with the opening, means to oscillate the subframe about the universal mounting means, and means on the subframe to move the support to bring one or the other of the light sources into register with the opening.

2. A signal device comprising a main frame adapted to be fixedly mounted on a car or the like and formed with an opening through which a light beam may project, a subframe, universal mounting means connecting the subframe to the main frame for universal pivotal movement relative thereto, a support pivoted on the subframe, a pair of light sources carried by the support to be moved selectively into register with the opening, a motor on one of the frames connected to the other of the frames to oscillate the subframe about the universal mounting means, a motor on the subframe connected to the support to move it about its pivot, and control switches to control said motors and the light sources.

3. A signal device comprising a main frame adapted to be fixedly mounted on a car or the like and formed with an opening through which a light beam may project, a subframe, universal mounting means connecting the subframe to the main frame for universal pivotal movement relative thereto, a support pivoted on the subframe, a pair of light sources carried by the support to be moved selectively into register with the opening, a motor on one of the frames connected to the other of the frames to oscillate the subframe about the universal mounting means, a motor on the subframe connected to the support to move it about its pivot, a latch on the subframe engageable with the support, a solenoid to disengage the latch, limit switches on the subframe operated by the support to control the last named motor and the solenoid, and a control switch simultaneously to energize the solenoid to release the latch, the last named motor to bring one of the light sources into register with the opening, and said one of the light sources.

4. A signal device comprising a main frame adapted to be mounted on a car or the like and formed with an opening through which a light beam may project, a sub-frame, mounting means connecting the sub-frame to the main frame for oscillatory movement relative thereto, a pair of angularly related light sources mounted upon the sub-frame and adapted to be moved selectively into register with the opening, and motor means for moving said sub-frame to change the position of said light sources and also for oscillating the sub-frame.

5. A signal device comprising a main frame adapted to be mounted on a car or the like and formed with an opening through which a light beam may project, a sub-frame, mounting means connecting the sub-frame to the main frame for pivotal movement relative thereto, a pair of light sources carried by said sub-frame in angular relation and adapted to be moved selectively into register with the opening, said light sources projecting visually different rays through said opening, and motor means for moving said sub-frame to bring said light sources selectively into register with the opening and for reciprocating said light sources when aligned with said opening.

6. A signal device comprising a main frame adapted to be mounted on a vehicle and formed with an opening through which a light beam may project, a pair of light sources adapted to project visually different rays, the rays from one of said light sources serving as a warning light, means for mounting said light sources within said frame for movement into and out of alignment with said opening and also for oscillating when aligned with said opening, and motor means for producing said movements of said light sources.

JEREMIAH D. KENNELLY.